Feb. 6, 1962 J. E. HECKETHORN 3,019,874
AUTOMATIC TWO-SPEED DRIVES FOR
AUTOMOBILE ACCESSORIES
Filed Sept. 15, 1958 2 Sheets-Sheet 1
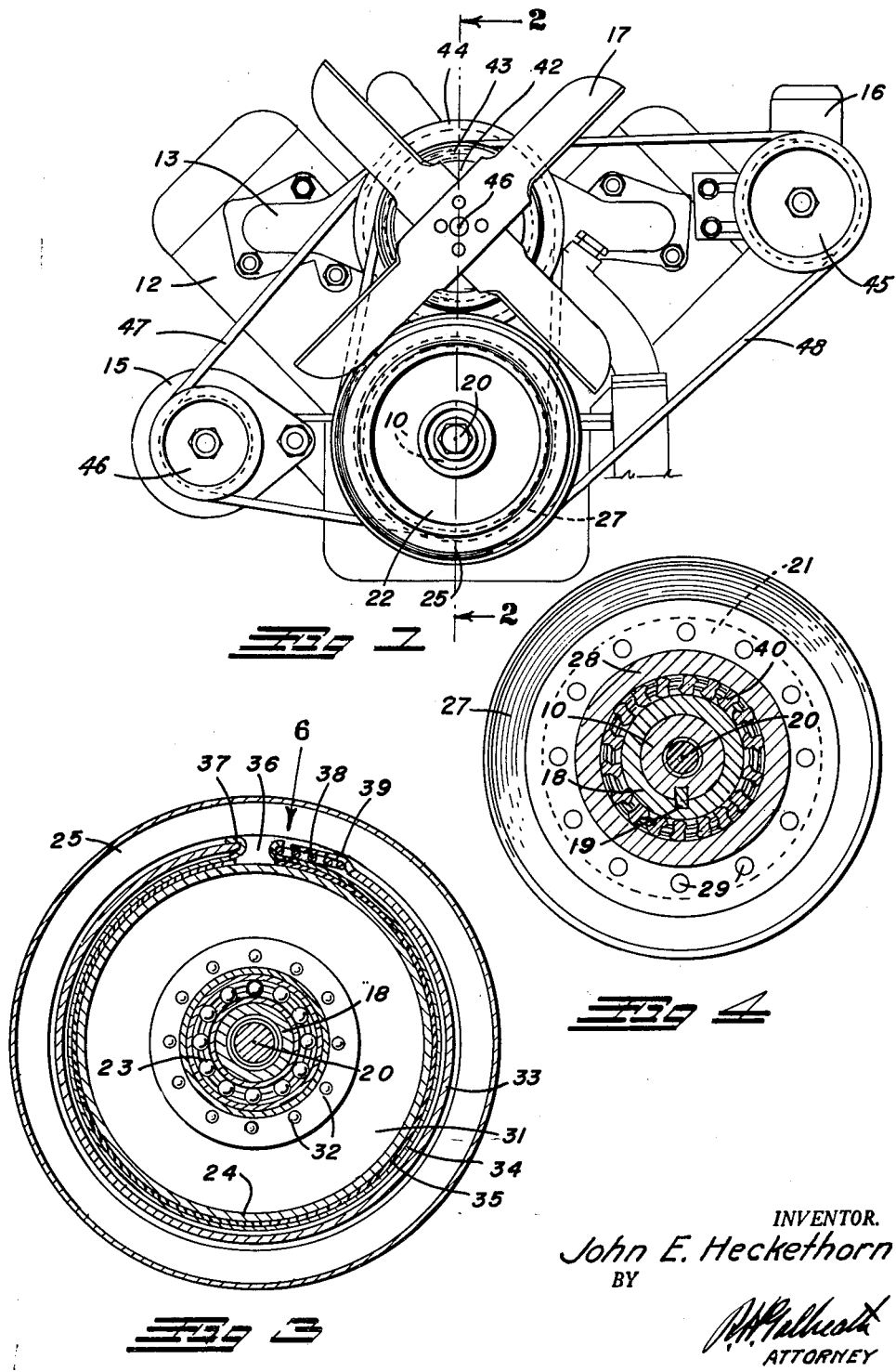
INVENTOR.
John E. Heckethorn
BY
ATTORNEY

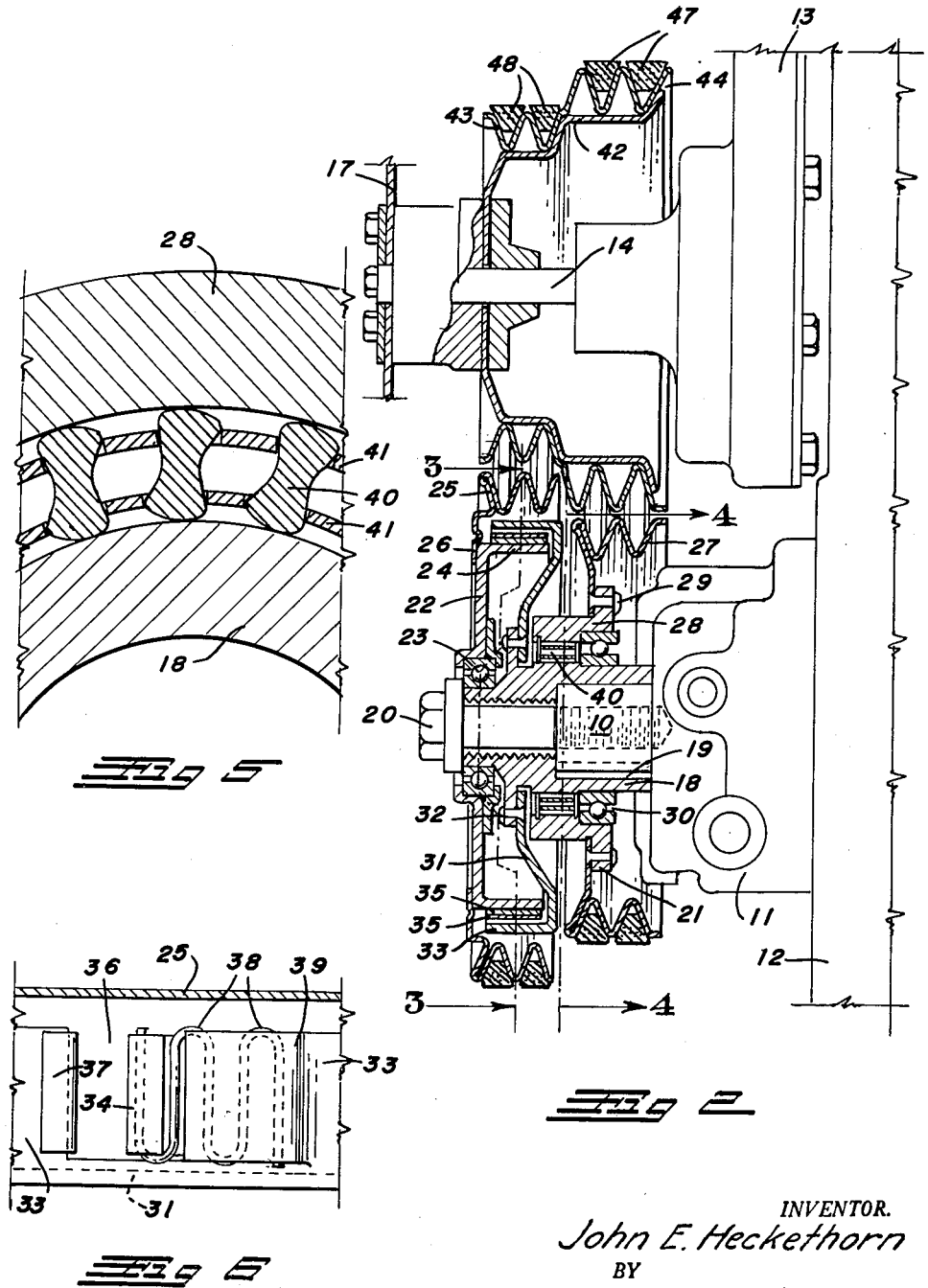

United States Patent Office 3,019,874
Patented Feb. 6, 1962

3,019,874
AUTOMATIC TWO-SPEED DRIVES FOR
AUTOMOBILE ACCESSORIES
John E. Heckethorn, Dyersburg, Tenn., assignor to
Heckethorn Manufacturing & Supply Co., Dyersburg,
Tenn., a corporation of Colorado
Filed Sept. 15, 1958, Ser. No. 761,258
2 Claims. (Cl. 192—48)

This invention relates to a belt transmission unit for transmitting power from an automotive engine to various accessories, such as the radiator fan, the water pump, the generator, the air conditioning compressor, etc. Such accessories are usually driven directly from the engine crank shaft by means of V-belts, and as a result the accessories are driven at a r.p.m. proportional to the speed of the crank shaft. The result is very unsatisfactory, due to the fact that, at exceedingly low engine speeds, the r.p.m. of the accessories is not sufficient for proper functioning, and, when the engine is driven at excessively high speeds, the accessories are driven at unnecessary and damaging high speeds, due to the fixed, preset speed ratios. It necessarily follows that if the fixed speed ratios are arranged to give satisfactory operation at low speeds, it will result in inefficient operation and damage to the equipment at high speeds and vice versa, if the ratios are preset to provide maximum function at high speeds, the accessories will be rotated at such low speeds in normal and sity driving as to be non-functional.

The principal object of this invention is to provide an automatic and highly efficient two-speed accessory drive unit which will automatically drive the accessories at an increased ratio at low engine speeds and at a decreased ratio at high engine speeds, so as to overcome the above described objections to the preset ratios.

Other objects of the invention are: to provide a two-speed accessory drive having a plurality of V-belts, all of which will be transmitting torque at all ratios so as to eliminate the necessity for the idler pulleys and the high belt tensions necessary with intermittently loaded belts and to eliminate belt slippage, which would affect the efficient operation of a centrifugal clutch mechanism; to provide a two-speed unit in which the automatic ratio mechanism is mounted upon and supported by the engine crank shaft so as to avoid overloading the bearings of the water pump and other accessory units; to provide an automotive change-ratio unit which can be applied to present automative equipment, which will not be affected by the moisture and debris encountered in an automotive engine compartment and which will provide extremely low bearing velocities so as to reduce bearing wear and increase the life of the equipment.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a front view of the improved automatic two-speed accessory drive, showing the relative positions of the various units as they would appear on the front of a conventional automotive engine;

FIG. 2 is an enlarged, vertical cross-section taken on the line 2—2, FIG. 1;

FIG. 3 is a still further enlarged, fragmentary cross-section taken on the line 3—3, FIG. 2;

FIG. 4 is a similar cross-section taken on the line 4—4, FIG. 2;

FIG. 5 is a detail view illustrating a type of spring as used in a centrifugal clutch mechanism employed in the improved drive; and FIG. 6 is an enlargement of a portion of FIG. 4 illustrating a type of sprag clutch employed in the invention.

In the drawing, conventional parts of an automotive engine are designated by numeral as follows: crank shaft 10, vibration dampener 11, engine block 12, water pump 13, water pump shaft 14, generator 15, Freon compressor 16, and radiator cooling fan 17.

This invention is designed to drive the generator 15, the compressor 16, the water pump 13, and the cooling fan 17 from the crank shaft 10 at a relatively high speed ratio when the crank shaft is rotating at low speed, and at a relatively low speed ratio when the crank shaft 10 is rotating at high speed.

The improved drive is driven from a crank shaft spindle 18 which is fitted over the forward extremity of the crank shaft 10 and keyed to rotate therewith by means of a suitable shaft key 19. The spindle 18 is maintained in place on the extremity of the crank shaft 10 by means of an axially positioned cap screw 20 threaded into the extremity of the crank shaft 10.

A front clutch plate 22 is rotatably mounted upon forward ball bearings 23 on the forward extremity of the spindle 18. The periphery of the front clutch plate 22 extends rearwardly to form a clutch flange 24. An annular, two-groove, large drive pulley 25 concentrically surrounds the clutch flange 24 in radially spaced rotation thereto. The pulley 25 is formed from relatively light sheet metal welded about the periphery of the plate 22, as indicated at 26. A pulley hub 28 is rotatably mounted, by means of rear ball bearings 30, upon and adjacent the rear of the spindle 18. A two-groove, sheet metal, small drive pulley 27 is secured to a flange 21 on the pulley hub 28 in any desired manner, such as by means of suitable rivets 29. A rear clutch plate 31 is fixedly mounted on the crank shaft spindle 18, such as by means of suitable rivets 32, and extends radially and concentrically outward between the pulleys 25 and 27. A clutch drum 33 is formed on and extends forwardly from, the rear clutch plate 31 in concentric speed relation to the clutch flange 24.

The clutch drum 33 is normally clutched to the clutch flange 24 by means of an annular clutch band 34 provided with suitable clutch lining 35. One extremity of the clutch band 34 extends outwardly through and is hooked over the edge of an attachment opening 36 in the clutch drum 33, as shown at 37 in FIG. 3. The other extremity of the clutch band 34 also extends outwardly through the attachment opening 36 and is hooked about one extremity of a "zig-zag" compression spring 38 as shown in FIG. 5. The spring 38 is compressed in a spring socket 39 formed in the clutch drum 33 and acts to constantly urge the two extremities of the clutch band 34 toward each other to cause the clutch lining 35 to frictionally grip the clutch flange 24.

Thus, it can be seen that if the crank shaft 10 be rotating, the large drive pulley 25 will rotate therewith due to the frictional engagement between the clutch lining 35 and the clutch flange 24, and that if the speed be increased, the centrifugal tendency of the clutch band 34 to expand radially will cause the latter to release from the clutch flange 24.

A sprag-type unidirectional clutch consisting of a plurality of spaced-apart, tilting or rocking sprags 40 is positioned between the pulley hub 28 and the crank shaft spindle 18. Such clutches are at present on the market under various names. The sprags are eccentric members mounted in spacing bands 41. The spaced sprags are positioned between the surfaces of the hub 29 and the spindle 18 so that if the outer pulley hub 28 tends to rotate faster than the inner spindle 18, the sprags simply tilt forwardly into a release position to allow free forward rotation of the outer pulley hub 28. If, however, the pulley hub tends to rotate slower than the spindle 18, the sprags simply tilt rearwardly into a gripping position so that power will be transmitted from the spindle 18 through the sprags to the pulley hub 28 to rotate the latter synchronously with the spindle.

Therefore, it can be seen that the small drive pulley 27 is free to rotate in the same direction as the crank shaft and at a higher speed than the crank shaft. However, should the speed of the pulley 27 decrease to crank shaft speed, the sprags will instantly clutch the pulley to the crank shaft spindle 18 to rotate it at crank shaft speed.

For the purposes of this invention, the shaft 14 of the water pump 13 serves as a countershaft in a belt transmission system. The usual water pump pulley is replaced by a step pulley 42 provided with a dual-groove, relatively small, counter-pulley 43 and a dual-groove, relatively large, counter pulley 44. The grooves of the small counter-pulley 43 are aligned with the grooves of the large drive pulley 25 and the grooves of the large counter-pulley 44 are aligned with the grooves of the small drive pulley 27. A dual-groove compressor pulley 45 is mounted on the shaft of the Freon compressor 16 in alignment with the large drive pulley 25, and a similar dual-groove generator pulley 46 is mounted on the shaft of the generator 15 in alignment with the small drive pulley 27.

A pair of similar, endless V-belts, which will be herein designated the generator belts 47, are trained about the generator pulley 46, the large counter-pulley 44 and the small drive pulley 27. A second pair of similar, endless V-belts which will be herein designated as the compressor belts 48, are trained about the compressor pulley 45, the large drive pulley 25, and the counter-pulley 43. It can be seen from the above that both of the pairs of belts 47 and 48 have a driving relation with the step pulley 42 and the water pump shaft 14.

At low engine r.p.m., power is transmitted from the large drive pulley 25 to the small counter-pulley 43 and to the Freon compressor pulley 45 by means of the compressor belts 48. Power is also transmitted, by means of the generator belts 47, from the large counter-pulley 44 of the step pulley 42 to the generator pulley 46 and also to the small drive pulley 27 to rotate the latter at a higher than crank shaft speed so that the drive pulley will override the sprags 40 as above described. Therefore, the pump 13, the generator 15, the compressor 16, and the fan 17 are being driven at a high-speed-ratio from the large drive pulley 25.

Now let us assume that the engine speed increases until a centrifugal force is developed sufficient to expand the clutch band 34 from driving engagement with the clutch flange 24. It can be seen that, when the latter occurs, the driving torque on the entire unit will be removed and all elements will tend to slow down until the speed of the small drive pulley 27 reaches crank shaft speed at which the time the sprags 40 will immediately take over to drive the unit at a low-speed-ratio from the large drive pulley 25.

The low-speed-ratio will remain in force until the engine speed again descends to a point which will allow the clutch band 34 to take over its driving function to cause the small drive pulley 27 to override the sprags 40.

It is desired to call attention to the following features:

(1) Since the friction clutch and the sprag clutch are both mounted directly upon the engine crank shaft, their action is positive and not effected by belt slippage or other uncertainties;

(2) Since the bearings 23 and 30 do not operate at engine speed, their maximum race differential speeds are relatively low (approximately 1450 r.p.m. front and 1750 r.p.m. rear) so that long, trouble free use is assured;

(3) The present conventional adjustable mounts of the Freon compressor and generator provide all necessary belt tension adjustments without any necessity for idler pulleys;

(4) The zig-zag spring 38 fits efficiently into the flat, limited space available in the clutch drum spring socket 39 and provides an accurate balanced tension on the clutch band 34;

(5) The large drive pulley 25 and the front clutch plate 22 provide a windshield for the front of the centrifugal clutch and the rear clutch plate 31 provides an enclosing housing for the clutch to protect the latter from foreign materials.

While a specific form of the improvement has been described and illustrated herein, it is to be understood that the same may be varied within the scope of the appended claims without departing from the spirit of the invention.

Having thus described the invention, what is claimed and desired secured by Letters Patent is:

1. A multiple clutch construction for a two speed accessory drive comprising: a drive spindle; a relatively large drive pulley rotatably mounted on said spindle adjacent the forward extremity thereof; a relatively small drive pulley rotatably mounted adjacent the rear extremity of said spindle; an annular clutch flange mounted on and extending rearwardly from said large drive pulley; a clutch drum fixedly mounted on said spindle and surrounding said flange in concentric, spaced relation; an annular, resiliently-expansible unitary clutch band completely surrounding said flange; hooked extremities formed on said clutch band, one extremity being hooked through an opening in said clutch drum; a relatively flat zig-zag compression spring mounted in said clutch drum, one extremity of said clutch band being hooked over said spring so that the inherent expansion of the latter will tension said clutch band to cause the latter to frictionally engage the circumference of said clutch flange until a predetermined speed is reached; and a directional clutch arranged to transmit torque from said spindle to said small drive pulley until the speed of the latter exceeds the speed of the former.

2. A centrifugally-releasable clutch comprising: an outer cylindrical drum; an inner cylindrical drum positioned concentrically within and in spaced relation to said outer drum; an annular, resiliently-expansible, unitary clutch band completely surrounding said inner drum; hooked extremities formed on said clutch band, one extremity being hooked through an opening in said outer cylindrical drum; a relatively flat, zig-zag compression spring mounted in said outer cylindrical drum, the other extremity of said clutch band being hooked over said spring so that the inherent expansion of said spring will tension said clutch band to cause the latter to frictionally engage the circumference of said inner cylindrical clutch drum until a speed sufficient to centrifugally expand said clutch band against the bias of said spring is reached.

References Cited in the file of this patent
UNITED STATES PATENTS

| | | |
|---|---|---|
| 1,983,827 | Winther et al. | Dec. 11, 1934 |
| 2,075,078 | Allen | Mar. 30, 1937 |
| 2,212,731 | Dunn | Aug. 27, 1940 |
| 2,388,424 | Lund | Nov. 6, 1945 |
| 2,477,176 | Gruenberg et al. | July 26, 1949 |
| 2,529,919 | Cunningham | Nov. 14, 1950 |
| 2,762,482 | Davis | Sept. 11, 1956 |
| 2,860,519 | Cavanaugh | Nov. 18, 1958 |
| 2,911,962 | McRae | Nov. 10, 1959 |
| 2,955,478 | Davis | Oct. 11, 1960 |